US012236903B2

(12) United States Patent
Wu et al.

(10) Patent No.: US 12,236,903 B2
(45) Date of Patent: Feb. 25, 2025

(54) DISPLAY DEVICE AND BACKLIGHT CONTROL METHOD THEREOF

(71) Applicant: Qisda Corporation, Taoyuan (TW)

(72) Inventors: Chun-Chang Wu, Taoyuan (TW); Yi-Zong Jhan, Taoyuan (TW); Jen-Hao Liao, Taoyuan (TW); Tse-Wei Fan, Taoyuan (TW); Wei-Yu Chen, Taoyuan (TW); Fu-Tsu Yen, Taoyuan (TW); Feng-Lin Chen, Taoyuan (TW)

(73) Assignee: Qisda Corporation, Taoyuan (TW)

( * ) Notice: Subject to any disclaimer, the term of this patent is extended or adjusted under 35 U.S.C. 154(b) by 0 days.

(21) Appl. No.: 18/305,395

(22) Filed: Apr. 24, 2023

(65) Prior Publication Data

US 2024/0029665 A1 Jan. 25, 2024

(30) Foreign Application Priority Data

Jul. 25, 2022 (CN) ........................ 202210880641.5

(51) Int. Cl.
*G09G 3/34* (2006.01)

(52) U.S. Cl.
CPC ....... *G09G 3/3406* (2013.01); *G09G 2310/08* (2013.01); *G09G 2320/0247* (2013.01); *G09G 2320/0261* (2013.01)

(58) Field of Classification Search
CPC ....... G09G 2310/08; G09G 2320/0247; G09G 2320/0261; G09G 2340/0435; G09G 2360/16; G09G 3/3406
See application file for complete search history.

(56) References Cited

U.S. PATENT DOCUMENTS

| | | | | |
|---|---|---|---|---|
| 11,501,723 | B2 | 11/2022 | Chen et al. | |
| 2005/0083280 | A1* | 4/2005 | Hiraki | G09G 3/342 345/87 |
| 2016/0180779 | A1* | 6/2016 | Suzuki | G09G 3/3406 345/694 |
| 2018/0315379 | A1* | 11/2018 | Du | G09G 3/3406 |
| 2019/0035344 | A1* | 1/2019 | Lin | G02F 1/133603 |
| 2019/0164506 | A1* | 5/2019 | Wu | G09G 3/3406 |
| 2019/0251914 | A1* | 8/2019 | Chen | G09G 3/342 |
| 2020/0135149 | A1* | 4/2020 | Lin | G09G 5/18 |
| 2020/0143756 | A1* | 5/2020 | Chen | G09G 3/3406 |
| 2020/0302848 | A1* | 9/2020 | Lin | G09G 3/36 |
| 2021/0312876 | A1* | 10/2021 | Chen | G09G 3/3406 |
| 2022/0415269 | A1* | 12/2022 | Liu | G09G 3/3406 |
| 2023/0042768 | A1* | 2/2023 | Choi | G09G 3/3406 |
| 2023/0419915 | A1* | 12/2023 | Huang | G09G 3/3648 |

* cited by examiner

*Primary Examiner* — Kenneth Bukowski

(57) ABSTRACT

A display device and a backlight control method of the display device are provided. When a duration of an image occlusion period is shorter than a preset duration, a backlight driving circuit is controlled to respectively provide a first pulse current and a second pulse current in a first light emitting period and a second light emitting period in each frame period, so as to drive a backlight unit to provide a first backlight and a second backlight. Here, the first pulse current is greater than the second pulse current.

18 Claims, 5 Drawing Sheets

DISPLAY DEVICE AND BACKLIGHT CONTROL METHOD THEREOF

CROSS-REFERENCE TO RELATED APPLICATION

This application claims the priority benefit of China application serial no. 202210880641.5, filed on Jul. 25, 2022. The entirety of the above-mentioned patent application is hereby incorporated by reference herein and made a part of this specification.

BACKGROUND

Technical Field

The disclosure relates to an electronic device; more particularly, the disclosure relates to a display device and a backlight control method thereof.

Description of Related Art

When a liquid crystal display (LCD) displays an image having a variable refresh rate (VRR), due to capacitor leakage, the brightness of the LCD panel may vary when frame rates are different, which leads to a flicker issue. In order to reduce the flicker, the frame rate is monitored according to the related art, and a backlight intensity or a grayscale voltage value is correspondingly adjusted to compensate the brightness. However, such a method requires additional elements for monitoring the frame rate; what is more, the adjustment cannot be performed in the same frame, and thus the flicker issue cannot be effectively solved.

SUMMARY

The disclosure provides a backlight control method of a display device capable of effectively solving issues of motion blur and flicker.

An embodiment of the disclosure provides a display device that includes a display panel, a backlight unit, a backlight driving circuit, and a control circuit. The display panel displays an image frame, and each frame period includes an image scanning period for displaying an image and an image occlusion period not for displaying the image. The backlight driving circuit is coupled to the backlight unit. The control circuit is coupled to the display panel and the backlight driving circuit. When a duration of the image occlusion period is shorter than a preset duration, a first pulse signal and a second pulse signal are respectively provided in a first light emitting period and a second light emitting period in each frame period, so as to control the backlight driving circuit to output a first pulse current and a second pulse current to drive the backlight unit provide a first backlight and a second backlight, where the first pulse current is greater than the second pulse current.

In an embodiment of the disclosure, a duration of the second light emitting period is changed in response to a change to the duration of the image occlusion period.

In an embodiment of the disclosure, the first light emitting period is a fixed duration.

In an embodiment of the disclosure, when the duration of the image occlusion period is shorter than the preset duration, in each frame period, the backlight driving circuit sequentially enters a delay period, the first light emitting period, and the second light emitting period, and a current occlusion period is set between the first pulse current and the second pulse current.

In an embodiment of the disclosure, in the delay period, at least one of the first pulse current and the second pulse current is at a high current level.

In an embodiment of the disclosure, in the delay period, the first pulse current and the second pulse current are at a low current level.

In an embodiment of the disclosure, the delay period is a fixed duration.

In an embodiment of the disclosure, the control circuit includes a processor, a timer, a first comparator, a second comparator, a third comparator, a first latch circuit, a second latch circuit, and an inverted circuit. The processor receives a vertical synchronization signal and display data, provides a reset signal according to the vertical synchronization signal, and provides a display driving signal to the display panel according to the display data, so as to drive the display panel to display the image frame. The timer is coupled to the processor and resets a count value according to the reset signal. The first comparator is coupled to the timer and provides a set signal according to a comparison result between the count value and the delay period. The second comparator is coupled to the timer and provides a first reset signal according to a comparison result between the count value and a sum of the delay period and the first light emitting period. The third comparator is coupled to the timer and provides a second reset signal according to a comparison result between the count value and a sum of the delay period, the first light emitting period, and the current occlusion period. The first latch circuit is coupled to the first comparator, the second comparator, and the backlight driving circuit, latches the set signal and the first reset signal, and outputs the first pulse signal to the backlight driving circuit. The second latch circuit is coupled to the first comparator and the third comparator, latches the set signal and the second reset signal, and outputs a latch signal. The inverted circuit is coupled to the second latch circuit and the backlight driving circuit and outputs the second pulse signal to the backlight driving circuit according to the latch signal. The backlight driving circuit generates the first pulse current according to the first pulse signal and generates the second pulse current according to the second pulse signal.

In an embodiment of the disclosure, a duration of the first light emitting period is shorter than a duration of the image scanning period In an embodiment of the disclosure, the control circuit continuously provides the second pulse signal when the duration of the image occlusion period is longer than or equal to the preset duration, so as to control the backlight driving circuit to continuously output the second pulse current to drive the backlight unit to continuously provide the second backlight.

In an embodiment of the disclosure, the control circuit adjusts a duration of the first light emitting period and a current ratio of the first pulse current to the second pulse current according to a mode switching command.

Another embodiment of the disclosure provides a backlight control method of a display device, where the display device is configured to display an image frame, and each frame period includes an image scanning period for displaying an image and an image occlusion period not for displaying the image. The backlight control method includes following steps. Whether a duration of the image occlusion period is shorter than a preset duration is determined. When the duration of the image occlusion period is shorter than the preset duration, a first pulse signal and a second pulse signal are respectively provided in a first light emitting period and a second light emitting period in each frame period, so as to control a backlight driving circuit to output a first pulse current and a second pulse current to drive a backlight unit to provide a first backlight and a second backlight. Here, the first pulse current is greater than the second pulse current In an embodiment of the disclosure, a duration of the second light emitting period is changed in response to a change to the duration of the image occlusion period.

In an embodiment of the disclosure, the first light emitting period is a fixed duration.

In an embodiment of the disclosure, when the duration of the image occlusion period is shorter than the preset duration, in each frame period, the backlight driving circuit sequentially enters a delay period, the first light emitting period, and the second light emitting period, and a current occlusion period is set between the first pulse current and the second pulse current.

In an embodiment of the disclosure, in the delay period, at least one of the first pulse current and the second pulse current is at a high current level.

In an embodiment of the disclosure, in the delay period, the first pulse current and the second pulse current are at a low current level.

In an embodiment of the disclosure, a duration of the first light emitting period is shorter than a duration of the image scanning period.

In an embodiment of the disclosure, the backlight control method includes:

continuously providing the second pulse signal when the duration of the image occlusion period is longer than or equal to the preset duration, so as to control the backlight driving circuit to continuously output the second pulse current to drive the backlight unit to continuously provide the second backlight.

In an embodiment of the disclosure, the backlight control method includes: adjusting a duration of the first light emitting period and a current ratio of the first pulse current to the second pulse current according to a mode switching command.

In view of the above, in one or more embodiments of the disclosure, when the duration of the image occlusion period is shorter than the preset duration, the backlight driving circuit is controlled to respectively provide the first pulse current and the second pulse current in the first light emitting period and the second light emitting period in each frame period, so as to drive the backlight unit to provide the first backlight and the second backlight. Here, the first pulse current is greater than the second pulse current, so that the first pulse current and the second pulse current may be controlled according to the corresponding change to the duration of the image occlusion period, which may effectively solve the issue of motion blur and flicker.

To make the aforementioned more comprehensible, several embodiments accompanied with drawings are described in detail as follows.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the description, serve to explain the principles of the disclosure.

DETAILED DESCRIPTION OF THE EMBODIMENTS

Figure 1:
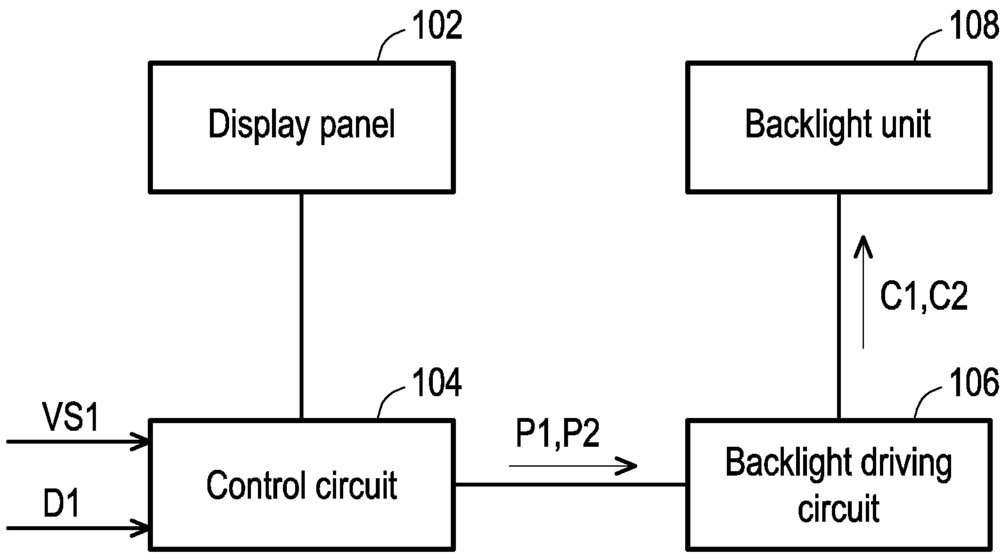
FIG. 1 is a schematic view of a display device according to an embodiment of the disclosure.
Figure 2:
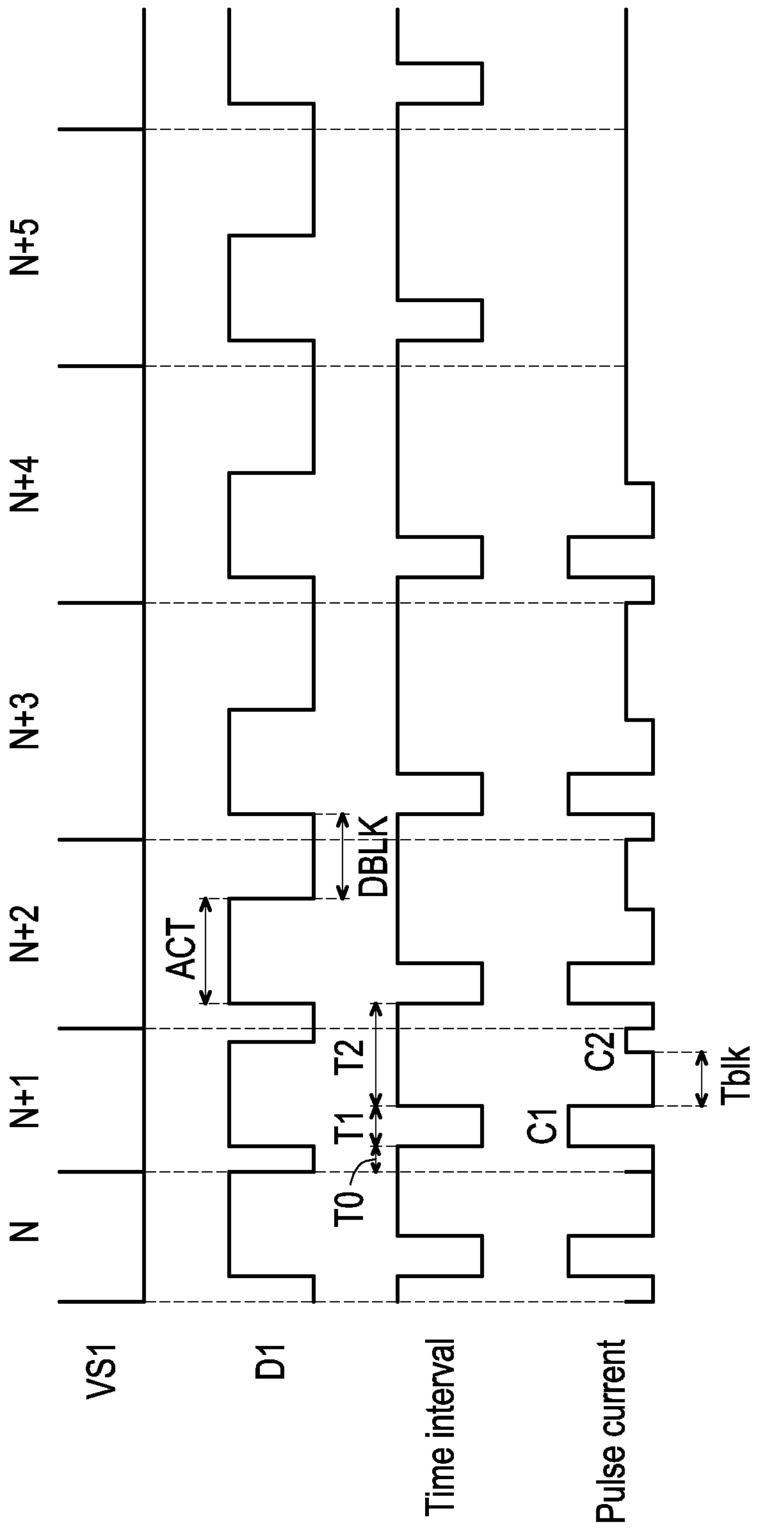
FIG. 2 is an operational timing diagram of a display device according to an embodiment of the disclosure.

FIG. 1 is a schematic view of a display device according to an embodiment of the disclosure. With reference to FIG. 1, a display device may include a display panel 102, a control circuit 104, a backlight driving circuit 106, and a backlight unit 108, the control circuit 104 is coupled to the display panel 102 and the backlight driving circuit 106, and the backlight driving circuit 106 is coupled to the backlight unit 108. The control circuit 104 may control the display panel 102 to display an image frame according to a vertical synchronization signal VS1 and display data D1, as shown in FIG. 2, and each frame period includes an image scanning period ACT for displaying an image and an image occlusion period DBLK not for displaying the image. In addition, the control circuit 104 is further configured to control the backlight driving circuit 106 to drive the backlight unit 108 to provide a backlight.

As shown in FIG. 2, time intervals N to N+5 respectively correspond to the gradually decreasing frame rates. When a duration of the image occlusion period DBLK is shorter than a preset duration, the backlight driving circuit sequentially enters a delay period T0, a first light emitting period T1, and a second light emitting period T2 in each frame period (for instance, frame periods N to N+4). Here, the delay period T0 and the first light emitting period T1 are fixed durations, and a duration of the second light emitting period T2 is changed in response to a change to the duration of the image occlusion period DBLK. For instance, when the duration of the image occlusion period DBLK becomes longer, the duration of the second light emitting period T2 also becomes longer correspondingly. A duration of the first light emitting period T1 is shorter than the duration of the image scanning period ACT.

Figure 3:
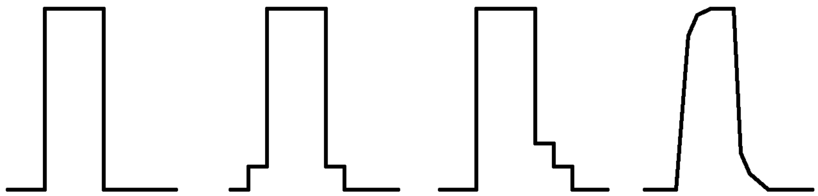
FIG. 3 is a schematic view of waveforms of pulse currents output by a backlight driving circuit according to an embodiment of the disclosure.

The control circuit 104 respectively provides a first pulse signal P1 and a second pulse signal P2 in the first light emitting period T1 and the second light emitting period T2 in each frame period (N to N+4), so as to control the backlight driving circuit 106 to output the corresponding first pulse current C1 and second pulse current C2 to drive the backlight unit 108 to provide a first backlight and a second backlight, where a current value of the first pulse current C1 is greater than a current value of the second pulse current C2, and a current occlusion period Tblk is set between the first pulse current C1 and the second pulse current C2. The pulse currents correspondingly provided by the backlight driving circuit 106 may be implemented in form of one of the four waveforms shown in FIG. 3, which should however not be construed as a limitation in the disclosure. In addition, the pulse current may have a preset current level in the delay period T0; for instance, in the embodiment shown in FIG. 2, the preset current level is a low current level (the current value is 0), which should however not be construed as a limitation in the disclosure. In other embodiments, the pulse current may also be preset to a specific current level, e.g., to a high current level of the first pulse current C1 or a high current level of the second pulse current C2. In addition, when the duration of the image occlusion period DBLK is longer than or equal to the preset duration (for instance, the frame period N+5 shown in FIG. 2), the control circuit 104 may continuously provide the second pulse signal P2 instead of the first pulse signal P1, so as to control the backlight driving circuit 106 to continuously output the corresponding second pulse current to drive the backlight unit 108 to continuously provide the second backlight.

Owing to the control of the first pulse current C1 and the second pulse current C2 by the corresponding change to the duration of the image occlusion period DBLK, the issue of motion blur and flicker may be effectively solved. Here, the adjustment of the duration of the first light emitting period T1 (i.e., adjusting the duration of the first pulse current C1) and a current ratio of the first pulse current C1 to the second pulse current C2 may better solve the issue of motion blur. For instance, reduction of the duration of the first light emitting period T1 or increase in the current ratio of the first pulse current C1 to the second pulse current C2 may enhance clarity of the image frame. The display device may have different display modes, and the control circuit 104 may adjust the duration of the first light emitting period T1 and the current ratio of the first pulse current C1 to the second pulse current C2 according to a mode switching command corresponding to the display mode of the display device, so as to enhance the clarity of the image frame of the display device. In addition, the control circuit 104 may also adjust the current occlusion period Tblk to improve the clarity of the image frame, and the longer the current occlusion period Tblk, the higher the clarity of the image frame.

Besides, when the duration of the image occlusion period DBLK is longer than or equal to the preset duration, the second pulse signal P2 is continuously provided to control the backlight driving circuit 106 to continuously output the corresponding second pulse current. Until the duration of the image occlusion period DBLK is shorter than the preset duration, the first pulse signal P1 and the second pulse signal P2 are then provided. Thereby, the flicker issue in case of the low frame rate may be prevented, and the service life of the backlight unit 108 may be increased. When the backlight unit 108 is implemented in form of a light emitting diode (LED), the photoelectric conversion efficiency of the LED may also be increased.

Figure 4:
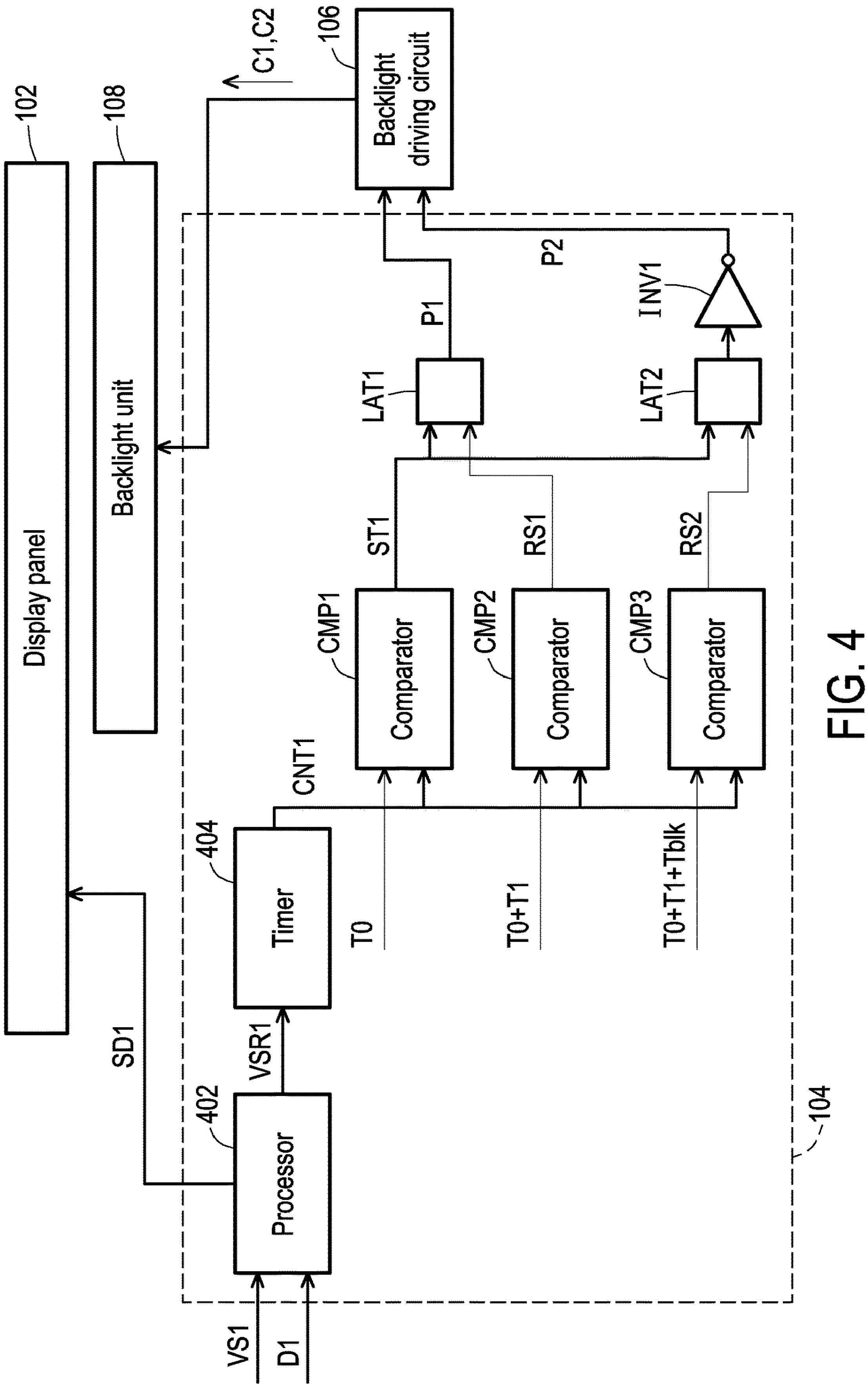
FIG. 4 is a schematic view of a display device according to another embodiment of the disclosure.

FIG. 4 is a schematic view of a display device according to another embodiment of the disclosure. Specifically, the implementation manner of the display device may be as shown in FIG. 4. According to the embodiment shown in FIG. 4, the control circuit 104 may include a processor 402, a timer 404, comparators CMP1-CMP3, latch circuits LAT1 and LAT2, and an inverted circuit INV1. The processor 402 is coupled to the display panel 102 and the timer 404, the timer 404 is coupled to the comparators CMP1-CMP3, the comparator CMP1 is coupled to the latch circuits LAT1 and LAT2, the comparator CMP2 is coupled to the latch circuit LAT1, the comparator CMP3 is coupled to the latch circuit LAT2, the latch circuit LAT1 is coupled to the backlight driving circuit 106, and the inverted circuit INV1 is coupled to the latch circuit LAT2 and the backlight driving circuit 106. The processor 402 may provide a reset signal VSR1 to the timer 404 according to vertical synchronization signal VS1, so as to reset a count value CNT1 of the timer 404 and provide a display driving signal SD1 to the display panel 102 according to the display data D1, whereby the display panel 102 is driven to display the image frame. The comparator CMP1 is configured to compare the count value CNT1 provided by the timer 404 and the delay period T0 and provide a set signal ST1 to the latch circuits LAT1 and LAT2 according to count value CNT1 and the delay period T0. The comparator CMP2 is configured to compare the count value CNT1 and the sum of the delay period T0 and the first light emitting period T1 and provide the reset signal RS1 to the latch circuit LAT1 according to the count value CNT1 and the delay period T0. The comparator CMP3 is configured to compare the count value CNT1 and the sum of the delay period T0, the first light emitting period T1, and the current occlusion period Tblk and provide the reset signal RS2 to the latch circuit LAT2 according to the count value CNT1 and the delay period T0.

The latch circuit LAT1 may latch the set signal ST1 and the reset signal RS1 and generate the first pulse signal P1. For instance, when the count value CNT1 is less than the delay period T0, the set signal ST1 and the reset signal RS1 are at the low logic level, and the first pulse signal P1 is at the low logic level. When the count value CNT1 is greater than the delay period T0 but less than the sum of the delay period T0 and the first light emitting period T1, the set signal ST1 is at the high logic level, the reset signal RS1 is at the low logic level, and the first pulse signal P1 is at the high logic level. When the count value CNT1 is greater than the sum of the delay period T0 and the first light emitting period T1, the reset signal RS1 is at the high logic level, and the first pulse current P1 is reset to the low logic level.

Similarly, the latch circuit LAT2 may latch the set signal ST1 and the reset signal RS2 and generate the second pulse signal P2 through the inverted circuit INV1. For instance, when the count value CNT1 is less than the sum of the delay period T0, the first light emitting period T1, and the current occlusion period Tblk, the set signal ST1 is at the high logic level, the reset signal RS1 is at the low logic level, and the second pulse signal P2 is at the low logic level. When the count value CNT1 is greater than the sum of the delay period T0, the first light emitting period T1, and the current occlusion period Tblk, the reset signal RS1 turns to be at the high logic level, and the second pulse current P2 turns to be at the high logic level. The backlight driving circuit 106 may, according to the first pulse signal P1 and the second pulse signal P2, output the corresponding first pulse current C1 and second pulse current C2 whose waveforms are exemplarily shown in FIG. 2, so as to drive the backlight unit 108 to provide the first backlight and the second backlight.

Figure 5:
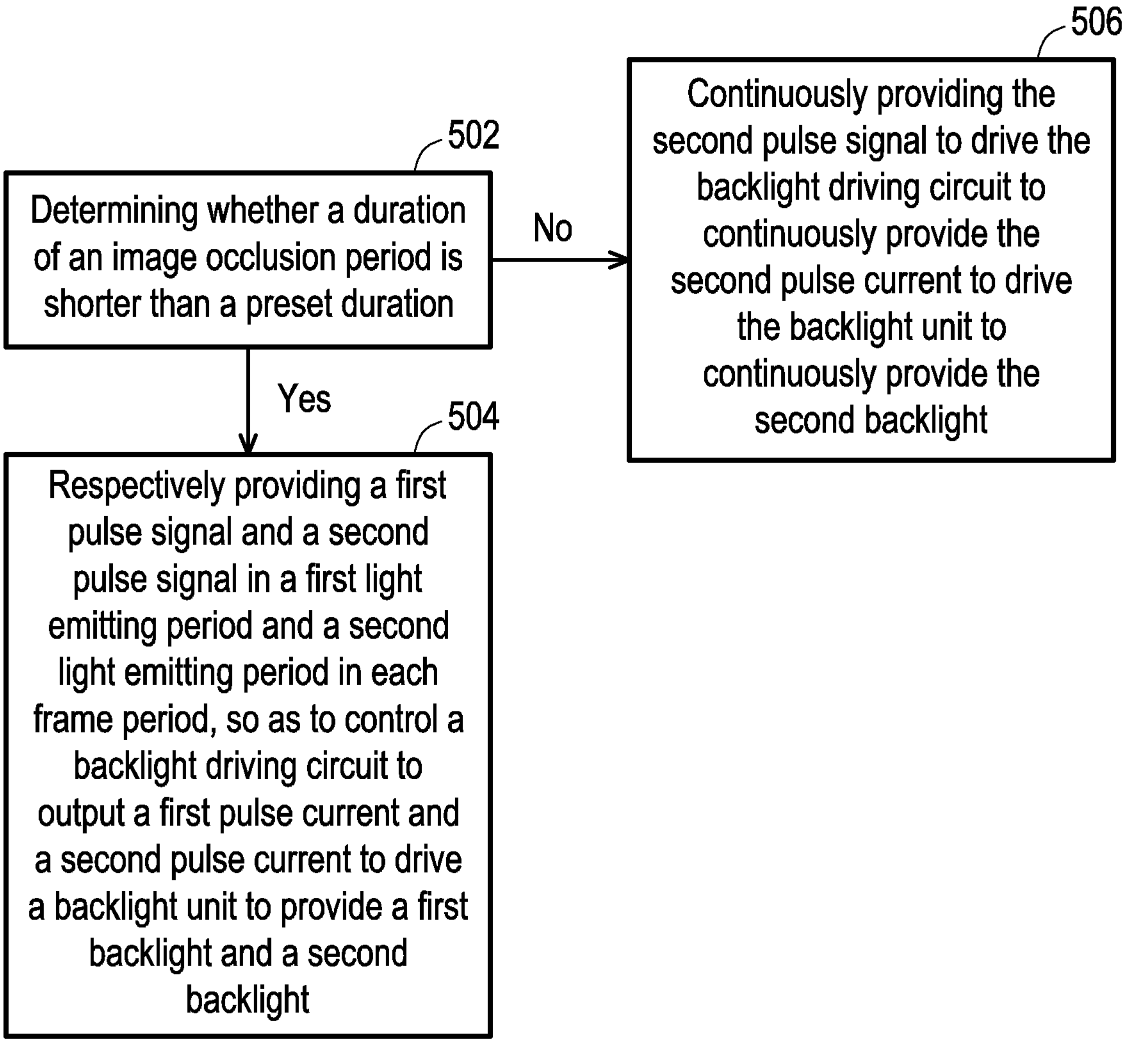
FIG. 5 is a flowchart of a backlight control method of a display device according to an embodiment of the disclosure.

FIG. 5 is a flowchart of a backlight control method of a display device according to an embodiment of the disclosure. It can be known from the above embodiments that the backlight control method of the display device may include following steps. It is determined whether a duration of an image occlusion period is shorter than a preset duration (step S502). When the duration of the image occlusion period is shorter than the preset duration, in each frame period, a backlight driving circuit sequentially enters a delay period, a first light emitting period, and a second light emitting period. Here, the first light emitting period is a fixed duration (a duration of the first light emitting period is shorter than a duration of an image scanning period), and a duration of the second light emitting period is changed in response to a change to the duration of the image occlusion period. In some embodiments, the duration of the first light emitting period and a current ratio of the first pulse current to the second pulse current may be adjusted according to a mode switching command corresponding to the display mode of the display device. When the duration of the image occlusion period is shorter than the preset duration, a first pulse signal and a second pulse signal are respectively provided in the first light emitting period and the second light emitting period in each frame period, so as to control a backlight driving circuit to output a first pulse current and a second pulse current to drive a backlight unit to provide a first backlight and a second backlight (step S504), where the first pulse current is greater than the second pulse current, and a current occlusion period is set between the first pulse current and the second pulse current. In the delay period, the first pulse current and the second pulse current are at a low current level, which should however not be construed as a limitation in the disclosure. It is also likely to set at least one of the first pulse current and the second pulse current to be at a high current level in the delay period. In addition, when the duration of the image occlusion period is longer than or equal to the preset duration, the second pulse signal is continuously provided to drive the backlight driving circuit to continuously output the corresponding second pulse current to drive the backlight unit to continuously provide the second backlight (step S506).

To sum up, in one or more embodiments of the disclosure, when the duration of the image occlusion period is shorter than the preset duration, the backlight driving circuit is controlled to respectively provide the first pulse current and the second pulse current in the first light emitting period and the second light emitting period in each frame period, so as to drive the backlight unit to provide the first backlight and the second backlight. Here, the first pulse current is greater than the second pulse current, so that the first pulse current and the second pulse current may be controlled according to the corresponding change to the duration of the image occlusion period, which may effectively solve the issue of motion blur and flicker.

It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. A display device, comprising:

- a display panel, displaying an image frame, each frame period comprising an image scanning period for displaying an image and an image occlusion period not for displaying the image;
- a backlight unit;
- a backlight driving circuit, coupled to the backlight unit; and
- a control circuit, coupled to the display panel and the backlight driving circuit, wherein when a duration of the image occlusion period is shorter than a preset duration, a first pulse signal and a second pulse signal are respectively provided in a first light emitting period and a second light emitting period in each frame period, so as to control the backlight driving circuit to output a first pulse current and a second pulse current to drive the backlight unit provide a first backlight and a second backlight, wherein the first pulse current is greater than the second pulse current, wherein the control circuit continuously provides the second pulse signal when the duration of the image occlusion period is longer than or equal to the preset duration, so as to control the backlight driving circuit to continuously output the second pulse current to drive the backlight unit to continuously provide the second backlight.

2. The display device according to claim 1, wherein a duration of the second light emitting period is changed in response to a change to the duration of the image occlusion period.

3. The display device according to claim 1, wherein the first light emitting period is a fixed duration.

4. The display device according to claim 1, wherein when the duration of the image occlusion period is shorter than the preset duration, in each frame period, the backlight driving circuit sequentially enters a delay period, the first light emitting period, and the second light emitting period, and a current occlusion period is set between the first pulse current and the second pulse current.

5. The display device according to claim 4, wherein in the delay period, at least one of the first pulse current and the second pulse current is at a high current level.

6. The display device according to claim 4, where in the delay period, the first pulse current and the second pulse current are at a low current level.

7. The display device according to claim 4, wherein the delay period is a fixed duration.

8. The display device according to claim 4, wherein the control circuit comprises:

- a processor, receiving a vertical synchronization signal and display data, providing a reset signal according to the vertical synchronization signal, and providing a display driving signal to the display panel according to the display data, so as to drive the display panel to display the image frame;
- a timer, coupled to the processor and resetting a count value according to the reset signal;
- a first comparator, coupled to the timer and providing a set signal according to a comparison result between the count value and the delay period;
- a second comparator, coupled to the timer and providing a first reset signal according to a comparison result between the count value and a sum of the delay period and the first light emitting period;
- a third comparator, coupled to the timer and providing a second reset signal according to a comparison result between the count value and a sum of the delay period, the first light emitting period, and the current occlusion period;
- a first latch circuit, coupled to the first comparator, the second comparator, and the backlight driving circuit, latching the set signal and the first reset signal, and outputting the first pulse signal to the backlight driving circuit;
- a second latch circuit, coupled to the first comparator and the third comparator, latching the set signal and the second reset signal, and outputting a latch signal; and
- an inverted circuit, coupled to the second latch circuit and the backlight driving circuit and outputting the second pulse signal to the backlight driving circuit according to the latch signal.

9. The display device according to claim 1, wherein a duration of the first light emitting period is shorter than a duration of the image scanning period.

10. The display device according to claim 1, wherein the control circuit adjusts a duration of the first light emitting period and a current ratio of the first pulse current to the second pulse current according to a mode switching command.

11. A backlight control method of a display device, wherein the display device is configured to display an image frame, each frame period comprising an image scanning period for displaying an image and an image occlusion period not for displaying the image, the backlight control method comprising:

determining whether a duration of the image occlusion period is shorter than a preset duration;

when the duration of the image occlusion period is shorter than the preset duration, respectively providing a first pulse signal and a second pulse signal in a first light emitting period and a second light emitting period in each frame period, so as to control a backlight driving circuit to output a first pulse current and a second pulse current to drive a backlight unit to provide a first backlight and a second backlight, wherein the first pulse current is greater than the second pulse current; and when the duration of the image occlusion period is longer than or equal to the preset duration, continuously providing the second pulse signal to control the backlight driving circuit to continuously output the second pulse current to drive the backlight unit to continuously provide the second backlight.

12. The backlight control method of the display device according to claim 11, wherein a duration of the second light emitting period is changed in response to a change to the duration of the image occlusion period.

13. The backlight control method of the display device according to claim 11, wherein the first light emitting period is a fixed duration.

14. The backlight control method of the display device according to claim 11, wherein when the duration of the image occlusion period is shorter than the preset duration, in each frame period, the backlight driving circuit sequentially enters a delay period, the first light emitting period, and the second light emitting period, and a current occlusion period is set between the first pulse current and the second pulse current.

15. He backlight control method of the display device according to claim 14, wherein in the delay period, at least one of the first pulse current and the second pulse current is at a high current level.

16. The backlight control method of the display device according to claim 14, wherein in the delay period, the first pulse current and the second pulse current are at a low current level.

17. The backlight control method of the display device according to claim 11, where a duration of the first light emitting period is shorter than a duration of the image scanning period.

18. The backlight control method of the display device according to claim 11, further comprising:

adjusting a duration of the first light emitting period and a current ratio of the first pulse current to the second pulse current according to a mode switching command.

* * * * *